United States Patent [19]

Hamano

[11] Patent Number: 4,851,249

[45] Date of Patent: Jul. 25, 1989

[54] DRIED TRIPE FLAKES AND PROCESS FOR PREPARING THE SAME

[76] Inventor: Hiroyuki Hamano, 1-3-7, Nakayama-Satsukidai, Takarazuka-shi, Hyogo, Japan

[21] Appl. No.: 148,795

[22] Filed: Jan. 27, 1988

[30] Foreign Application Priority Data

Feb. 9, 1987 [JP] Japan ................................. 62-28934

[51] Int. Cl.$^4$ ............................................. A23L 1/311
[52] U.S. Cl. ..................................... 426/315; 426/457; 426/473; 426/641; 426/646; 426/652
[58] Field of Search ............... 426/641, 646, 457, 473, 426/44, 49, 315, 650, 652

[56] References Cited

U.S. PATENT DOCUMENTS

| | | |
|---|---|---|
| 2,461,291 | 2/1949 | McKee . |
| 2,521,849 | 9/1950 | Hopkins et al. . |
| 3,067,043 | 12/1962 | Marsh et al. .......................... 426/646 |
| 3,432,311 | 3/1969 | Gruner . |
| 3,664,849 | 5/1972 | Autry . |
| 3,709,698 | 1/1973 | Davis . |
| 4,016,295 | 4/1977 | Burrows et al. ................. 426/646 X |
| 4,239,785 | 12/1980 | Roth ..................................... 426/266 |
| 4,279,935 | 7/1981 | Kentor ............................. 426/646 X |
| 4,446,159 | 5/1984 | Roth ..................................... 426/249 |
| 4,450,183 | 5/1984 | Steinberg et al. ................... 426/646 |

FOREIGN PATENT DOCUMENTS

| | | | |
|---|---|---|---|
| 48746 | 12/1974 | Japan .................................. 426/641 |
| 17698 | 1/1984 | Japan .................................. 426/641 |

*Primary Examiner*—Arthur L. Corbin
*Attorney, Agent, or Firm*—Armstrong, Nikaido, Marmelstein, Kubovcik & Murray

[57] ABSTRACT

Ready-to-eat dried flakes made from tripe. The flakes are prepared by utilizing the inherent characteristic of the tripe, i.e. its abundant fibrous tissue which renders the tripe stiff and difficult to eat. In accordance with the present invention, a mass of tripe is first boiled or steamed and then soaked in a seasoning-bath containing at least mirin, garlic, ginger, and beef flavoring. After the seasoning treatment, the mass of tripe is smoked for an extended time to obtain a hardened meat product having a water content of 18-30 weight % followed by exfoliating the tripe into thin flakes which are ready to eat as snacks or as toppings.

6 Claims, No Drawings

DRIED TRIPE FLAKES AND PROCESS FOR PREPARING THE SAME

BACKGROUND OF THE INVENTION

1. Field of the Invention

The present invention is directed to dried meat flakes and process for preparing the same, and more particularly to thin meat flakes from a hardened tripe and the like entrails abundant with fibrous texture.

2. Description of the prior art

Although tripe is served by grilling, it has not been widely accepted in other food processing because of its inherent hard and dense texture suffering from abundant fibrous tissue and, in most cases, the tripe is disposed of as garbage.

SUMMARY OF THE INVENTION

In view of the above, it is therefore highly desirable to effectively utilize tripe as easy an accessible food item. The applicant has found that the abundant fibrous tissue found in the tripe can positively give desirable characteristic when processed into dried thin flakes. That is, the fibrous tissues can serve to retain the texture of the dried meat stiff enough to be subsequently exfoliated into thin flakes successfully without causing the flakes to be broken. This enables the dried chunk of meat to be exfoliated into flakes of reduced thickness as less as 0.1 to 0.4 mm ready to eat as snack items or as toppings.

Accordingly, it is a primary object to effectively utilize tripe as food items in the form of thin flakes of dried meat.

In accordance with the present invention, the dried meat flakes are prepared in the following steps:

(a) boiling a chunk of tripe inherently abundant with fibrous tissue;

(b) soaking the boiled tripe in a seasoning-bath containing at least mirin, garlic, ginger, and beef flavoring, the mirin being an alcoholic liquid made by fermenting the mixture of steamed rice, distilled liquor, and malted rice and squeezing the resulting mixture;

(c) removing the meat from the seasoning-bath and subjecting it to smoke for an extended time to obtain a hardened meat product having a reduced water content of 18 to 30 wt%; and (d) exfoliating the hardened meat product into ready-to-each dried flakes as thin as 0.1 to 0.4 mm.

The seasoning-bath is made to penetrate into the innermost portion of the meat to uniformly season the whole bulk of the tripe. The seasoning step, particularly the application of mirin, serves to make the tripe mellow to render the finished flakes palatable. In preferred embodiments, a suitable flavoring is added to the seasoning-bath in order to produce finished flakes having an extra pleasant taste. Included in such flavorings are soy sauce, curry powder, and miso. It is therefore another object of the present invention to provide dried meat flakes having extra taste.

DESCRIPTION OF THE INVENTION

The present invention utilizes tripe as an entrail meat material from which dried meat flakes are made. Although the tripe is preferred, it is equally possible to utilize other entrail meat material having an abundance of fibrous tissue like tripe. The tripe available in the form of chunk is first boiled or steamed for 30 to 60 minutes. The chunk of tripe thus cooked is then soaked for 3 to 24 hours in a seasoning-bath which is a mixture solution containing at least "mirin", garlic, ginger, and beef flavoring. The term "mirin" is widely accepted in Japan as indicating a seasoning alcoholic liquid which is made by fermenting a mixture of steamed rice, distilled liquor, and malted rice and squeezing the resulting mixture to recover mirin. After removing the tripe from the seasoning-bath, the chunk of the tripe is dried in a oven or smoked for 3 to 7 days to obtain a hardened meat product having a reduced water content of 18 to 30 wt%, preferably 18 to 20 wt%. Subsequently, the hardened product is exfoliated with, for example, planer-like cutting means, into very thin flakes of dried meat of 0.1 to 0.4 mm in thickness which are ready to eat as snack-type food items or as a topping. As necessary, the resulting flakes may be further processed by a suitable mixture of flavorings including beef flavoring, seasoning chemicals, peppers, and starch as an extender. The addition of such flavoring are made by firstly spraying a suitable amount of cooking oil on the surfaces of the flakes and by spraying the mixture of the above flavorings followed by stirring and drying the flakes in the stream of hot air. Other additives such as sugar, curry powder, and miso powder may be incorporated in the flavoring mixture, as necessary. Miso powder is obtained by grinding a mixture of steamed rice, cooked soybeans and salt and fermenting the mixture in brine. The mixture is then dried.

The present invention will be discussed with reference to the following examples, which are provided by way of illustration and not by way of limitation.

EXAMPLE 1

10 Kg of tripe in the form of a chunk was boiled for 60 minutes and was transferred into a seasoning-bath consisting of 3.6 l of soy sauce, 1.8 l of mirin, 30 g of ginger, 30 g of garlic, 15 g of synthetic seasoning, 15 g of beef flavoring, 7 g of vitamin E, and 5 g of vitamin C. After the boiled chunk of tripe was soaked in the seasoning-bath for 20 hours, it was smoked for 5 days to obtain 3 kg of hardened meat product having a water content of 18 to 20 wt.% The resulting meat product was then exfoliated into 0.1 to 0.4 mm thick of dried flakes ready to eat as snack items or as toppings.

EXAMPLE 2

The same steps were carried out as in Example 1 except that the seasoning-bath was changed in obtaining the dried flakes of tripe. The seasoning-bath contains 30 l of water, 29 l of mirin, 950 g of garlic, 950 g of ginger, 1200 g of beef flavoring, 1200 g of vitamin E, and 40 Kg of curry powder. The resulting dried flakes possess a curry flavor.

EXAMPLE 3

The same steps were carried out as in Example 1 except that the seasoning-bath was changed to obtain the dried flakes of tripe. The seasoning-bath; contains 30 l of water, 29 l of mirin, 950 g of garlic, 950 g of ginger, 1200 g of beef flavoring, 1200 g of vitamin E, and 40 Kg of miso. The resulting dried flakes possess miso flavor.

EXAMPLE 4

10 Kg of tripe in the form of a chunk was boiled for 60 minutes and was transferred into a seasoning-bath consisting of 75 l of soy sauce, 25 l of mirin, 2 Kg of garlic, 1 Kg of ginger, 0.5 Kg of black pepper, 1.2 Kg of beef flavoring, 2 Kg of sugar, 50 g of red pepper essence, 1 Kg of synthetic seasoning. After the boiled chunk of tripe was soaked in the seasoning-bath for 3 hours, it was smoked for 3 days to obtain 4 kg of hardened meat product having a water content of 18 to 20 wt%. The resulting meat product was then exfoliated into 0.1 to 0.4 mm thick of dried flakes. 50 g of cooking oil was sprayed onto the surface of the resulting flakes weighing 1 Kg. A mixture of 30 g of beef flavor, 10 g of synthetic seasoning, 60 g of sugar, 3 g of pepper, and 30 g of starch as an extender was subsequently sprayed on the flakes processed with the cooking oil followed by stirring and drying with exposure to a hot air stream. With the latter seasoning process, the finished flakes possess a slightly sweet taste.

EXAMPLE 5

The same procedure as in the above example 4 was repeated to obtain dried meat flakes of 0.1 to 0.4 mm in thickness. After spraying 50 g of cooking oil onto the surfaces of the dried flakes having a total weight of 1 Kg. A mixture of 30 g of beef flavoring, 10 g of synthetic seasoning, 6 g of pepper, and 30 g of starch as an extender was sprayed onto the surfaces of the oil treated flakes, which were subsequently stirred and dried by exposure to hot air to obtain dried meat flakes possessing a sharp taste.

EXAMPLE 6

The same procedure as in the above example 4 was repeated to obtain dried meat flakes of 0.1 to 0.4 mm in thickness. After spraying 50 g of cooking oil onto the surfaces of the dried flakes having a total weight of 1 Kg. A mixture of 30 g of beef flavoring, 10 g of synthetic seasoning, 3 g of pepper, 30 g of curry powder, and 30 g of starch as an extender was sprayed onto the surfaces of the oil treated flakes, which were subsequently stirred and dried by exposure to hot air to obtain dried meat flakes possessing a sharp curry hot taste.

EXAMPLE 7

The same procedure as in the above example 4 was repeated to obtain dried meat flakes of 0.1 to 0.4 mm in thickness. After spraying 50 g of cooking oil onto the surfaces of the dried flakes having a total weight of 1 Kg. A mixture of 30 g of beef flavoring, 10 g of synthetic seasoning, 3 g of pepper, 30 g of miso powder, and 30 g of starch as an extender was sprayed onto the surfaces of the oil treated flakes, which were subsequently stirred and dried by exposure to hot air to obtain dried meat flaskes possessing a miso flavor.

What is claimed is:

1. Dried meat flakes made from tripe having an abundance of fibrous tissue, said dried meat flakes being prepared by the steps comprising:
    cooking a chunk of said tripe;
    soaking the cooked tripe in a seasoning-bath containing at least mirin, garlic, ginger, and beef flavoring;
    dehydrating the soaked tripe by smoking to obtain a hardened meat product having a water content of about 18 to 30% by weight; and
    exfoliating the hardened meat product into ready to eat flakes having a thickness of less than 0.1 to 0.4 mm.

2. A process for preparing dried meat flakes from tripe having an abundance of fibrous tissue, the process comprising the steps of:
    cooking a chunk of tripe;
    soaking the cooked tripe in a seasoning-bath containing at least mirin, garlic, ginger, and beef flavoring;
    dehydrating the soaked tripe by smoking to obtain a hardened meat product having a water content of about 18 to 30% by weight; and
    exfoliating the hardened meat product into ready to eat flakes having a thickness of less than 0.1 to 0.4 mm.

3. A process of preparing dried meat flakes as set forth in claim 2, wherein said seasoning-bath further comprises soy sauce.

4. A process of preparing dried meat flakes as set forth in claim 2, wherein said seasoning-bath further comprises miso.

5. A process of preparing dried meat flakes as set forth in claim 2, wherein said seasoning-bath further comprises curry powder.

6. A process of preparing dried meat flakes as set forth in claim 2, wherein said seasoning-bath further comprises vitamin E.

* * * * *